(12) United States Patent
Salter et al.

(10) Patent No.: US 9,463,738 B2
(45) Date of Patent: Oct. 11, 2016

(54) SEATBELT LIGHTING SYSTEM

(71) Applicant: Ford Global Technologies, LLC, Dearborn, MI (US)

(72) Inventors: Stuart C. Salter, White Lake, MI (US); James J. Surman, Clinton Township, MI (US); Edward Joseph DeSmet, Canton, MI (US); Michael Masserant, Newport, MI (US); Christine Boese, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/809,671

(22) Filed: Jul. 27, 2015

(65) Prior Publication Data

US 2015/0329041 A1 Nov. 19, 2015

Related U.S. Application Data

(63) Continuation-in-part of application No. 14/728,385, filed on Jun. 2, 2015, which is a continuation-in-part of application No. 14/603,636, filed on Jan. 23, 2015, which is a continuation-in-part of application No. 14/086,442, filed on Nov. 21, 2013.

(51) Int. Cl.
*B60Q 1/00* (2006.01)
*B60Q 1/26* (2006.01)
*B60Q 3/02* (2006.01)
*B60Q 3/00* (2006.01)
(Continued)

(52) U.S. Cl.
CPC ............ *B60Q 3/0243* (2013.01); *B60Q 3/008* (2013.01); *B60Q 3/0216* (2013.01); *B60Q 3/0293* (2013.01); *B60R 22/12* (2013.01); *F21V 9/16* (2013.01); *H05B 37/0218* (2013.01); *H05B 37/0227* (2013.01); *B60R 2022/4866* (2013.01); *Y02B 20/46* (2013.01)

(58) Field of Classification Search
CPC A44B 11/2565; B60Q 3/008; B60Q 3/0243; B60Q 3/0293; B60R 22/18; B60R 2022/1806; B60R 22/1812; F21K 9/56; F21V 9/16; H05B 37/0218; H05B 37/0227
USPC .................................. 362/487–488, 509–510
See application file for complete search history.

(56) References Cited

U.S. PATENT DOCUMENTS 5,472,235 A 12/1995 Dubay
5,709,453 A 1/1998 Krent et al.
(Continued)

FOREIGN PATENT DOCUMENTS

CN 101337492 A 1/2009
CN 201169230 Y 2/2009
(Continued)

*Primary Examiner* — Jason Moon Han
(74) *Attorney, Agent, or Firm* — Vichit Chea; Price Heneveld LLP

(57) ABSTRACT

A lighting system for a vehicle seatbelt assembly is provided herein. The lighting system includes a light source disposed on a seatbelt webbing. A first photoluminescent structure is configured to luminesce in response to excitation by at least a portion of the light source. A controller is configured to control an activation state of the light source. In some embodiments, the light source may implement a thin design, thereby helping to fit the light source into small package spaces of the vehicle where traditional light sources may not be practicable.

20 Claims, 11 Drawing Sheets

(51) Int. Cl.
*F21V 9/16* (2006.01)
*H05B 37/02* (2006.01)
*B60R 22/12* (2006.01)
*B60R 22/48* (2006.01)

(56) References Cited

U.S. PATENT DOCUMENTS

| | | | |
|---|---|---|---|
| 5,732,975 A | 3/1998 | Gallegos | |
| 6,102,440 A | 8/2000 | Bergkessel | |
| 6,117,362 A | 9/2000 | Yen et al. | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,161,472 B2 | 1/2007 | Strumolo et al. | |
| 7,213,923 B2 | 5/2007 | Liu et al. | |
| 7,264,366 B2 | 9/2007 | Hulse | |
| 7,264,367 B2 | 9/2007 | Hulse | |
| 7,441,914 B2 | 10/2008 | Palmer et al. | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,071,988 B2 | 12/2011 | Lee et al. | |
| 8,097,843 B2 | 1/2012 | Agrawal et al. | |
| 8,136,425 B2 | 3/2012 | Bostick | |
| 8,163,201 B2 | 4/2012 | Agrawal et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,286,378 B2 | 10/2012 | Martin et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,773,012 B2 | 7/2014 | Ryu et al. | |
| 8,846,184 B2 | 9/2014 | Agrawal et al. | |
| 8,952,341 B2 | 2/2015 | Kingsley et al. | |
| 9,057,021 B2 | 6/2015 | Kingsley et al. | |
| 9,065,447 B2 | 6/2015 | Buttolo et al. | |
| 9,299,887 B2 | 3/2016 | Lowenthal et al. | |
| 2001/0033492 A1* | 10/2001 | Rogers | B60Q 3/004 362/483 |
| 2002/0159741 A1 | 10/2002 | Graves et al. | |
| 2002/0163792 A1 | 11/2002 | Formoso | |
| 2003/0179548 A1 | 9/2003 | Becker et al. | |
| 2004/0213088 A1 | 10/2004 | Fuwausa | |
| 2006/0087826 A1 | 4/2006 | Anderson, Jr. | |
| 2007/0032319 A1 | 2/2007 | Tufte | |
| 2007/0285938 A1 | 12/2007 | Palmer et al. | |
| 2009/0219730 A1 | 9/2009 | Syfert et al. | |
| 2009/0251920 A1 | 10/2009 | Kino et al. | |
| 2009/0262515 A1 | 10/2009 | Lee et al. | |
| 2009/0299577 A1* | 12/2009 | Demant | B60R 22/48 701/45 |
| 2010/0013622 A1* | 1/2010 | Rumps | A44B 11/2565 340/457.1 |
| 2011/0012062 A1 | 1/2011 | Agrawal et al. | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0033372 A1 | 2/2013 | Medal et al. | |
| 2013/0335994 A1 | 12/2013 | Mulder et al. | |
| 2014/0065442 A1 | 3/2014 | Kingsley et al. | |
| 2014/0103258 A1 | 4/2014 | Agrawal et al. | |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0138789 A1 | 5/2015 | Singer et al. | |
| 2015/0267881 A1 | 9/2015 | Salter et al. | |
| 2016/0016506 A1 | 1/2016 | Collins et al. | |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

* cited by examiner

SEATBELT LIGHTING SYSTEM

CROSS-REFERENCE TO RELATED APPLICATIONS

This application is a continuation-in-part of U.S. patent application Ser. No. 14/728,385, filed Jun. 2, 2015, entitled "ILLUMINATED SEATBELT ASSEMBLY" which is a continuation-in-part of U.S. patent application Ser. No. 14/603,636, filed Jan. 23, 2015, entitled "DOOR ILLUMINATION AND WARNING SYSTEM" which is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related applications are hereby incorporated by reference as if fully set forth herein.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a lighting system for a seatbelt assembly is disclosed. The seatbelt assembly includes a light source disposed on a seatbelt webbing. A portion of the light source substantially prevents a seatbelt tongue member from movement beyond the light source. A first photoluminescent structure is operatively coupled to the light source and configured to luminesce in response to excitation by the light source.

According to another aspect of the present invention, a lighting system for a vehicle seatbelt is disclosed. The lighting system includes a light source disposed on a seatbelt webbing. A first photoluminescent structure is configured to luminesce in response to excitation by at least a portion of the light source.

According to yet another aspect of the present invention, a lighting system for a vehicle seating assembly is disclosed. The lighting system includes a light source disposed within the seating assembly. First and second photoluminescent structures are operatively coupled to the light source. The first and second photoluminescent structures are configured to luminesce in response to excitation by light output from at least a portion of the light source.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
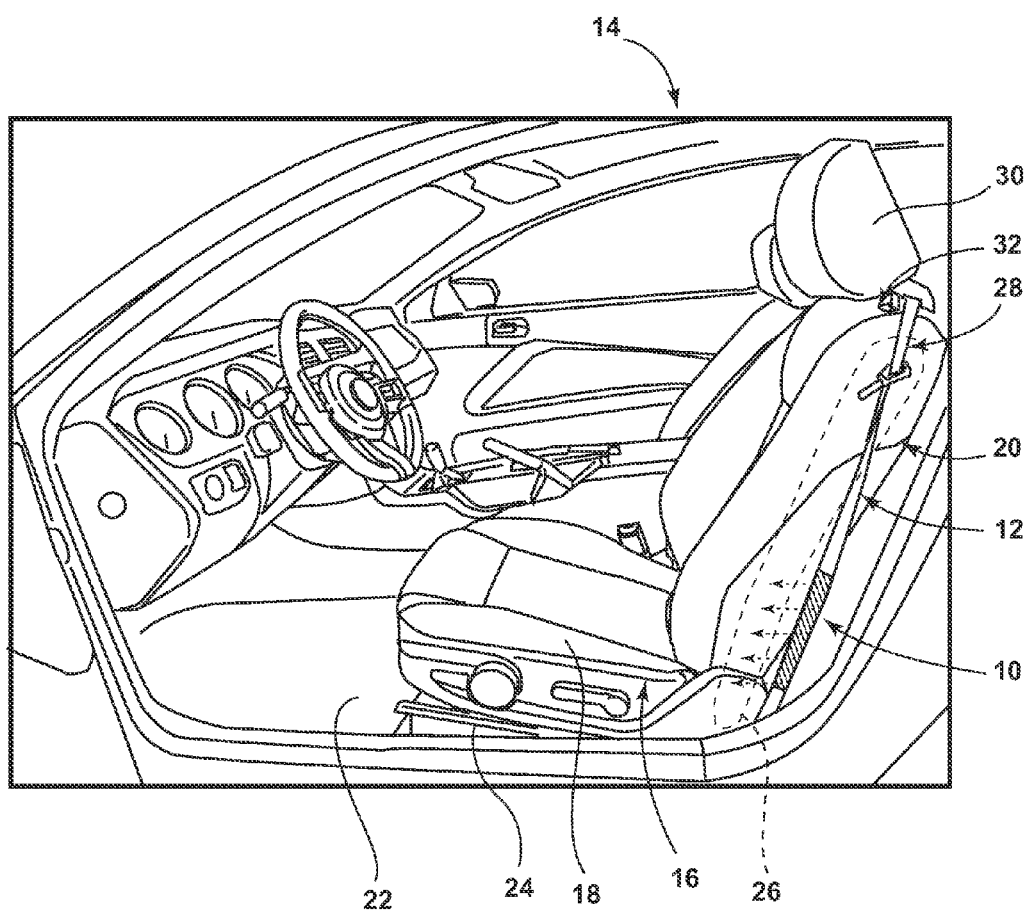
FIG. 1 is a perspective view of a vehicle interior having a lighting system employed on a seatbelt assembly according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone;

A and B in combination; A and C in combination; B and C in combination; or A, B, and C in combination.

The following disclosure describes a lighting system configured to illuminate an area proximately located to a seatbelt assembly. The lighting system may advantageously employ one or more photoluminescent structures to illuminate in response to pre-defined events. The one or more photoluminescent structures may be configured to convert light received from an associated light source and re-emit the light at a different wavelength typically found in the visible spectrum. In some embodiments, the light source may implement a thin design, thereby helping to fit the light source into small package spaces of the vehicle where traditional light sources may not be practicable.

Referring to FIG. 1, a lighting system 10 is disposed within a seatbelt assembly 12 of a vehicle 14 that is configured to illuminate an area and/or components of the vehicle proximately located to a seating assembly 16, according to one embodiment. The seating assembly 16 includes a seat 18 pivotally coupled with a seatback 20. The seat 18 is slidably coupled with a floor 22 of the vehicle 14 about a track assembly 24. The track assembly 24 is configured to allow the vehicle seating assembly 16 to be adjusted in a forward and a rearward direction relative to the vehicle 14. It is understood that the seating assembly 16 may be positioned at various locations through the vehicle 14 other than the illustrated position, such as passenger side location, a mid-row location, and rear seat location. It is also conceivable that the seat 18 may not include the track assembly 24 and may be otherwise movably attached to the vehicle 14, or alternatively, may be fixedly coupled with the floor 22 of the vehicle 14. Further, it should be appreciated that the lighting system 10 described herein may be utilized on any portion of any seating assembly 16 disposed within a vehicle 14.

The seatback 20 of the seating assembly 16 may include side supports 26 that pivotally couple with a rear portion of the seat 18 and extend upward from the seat 18 to an upper portion 28 of the seatback 20. The seatback 20 also includes a cushion and an upholstery material disposed over the cushion substantially enclosing the seatback 20. A headrest 30 may be removably and adjustably coupled with the upper portion 28 of the seatback 20 and may be substantially centered thereon. Accordingly, an attachment structure 32 for the headrest 30 may include the seatback 20 and more specifically, the upper portion 28 of the seatback 20. It should be appreciated that the seatbelt assembly 12 described herein may be utilized for any vehicle 14 such as, but not limited to, coupes, sedans, trucks, sport utility, vans, and the like. Further, it should be appreciated that any lighting system 10 found elsewhere on the vehicle 14 may also be manufactured in accordance with the principles of the present disclosure.

Figure 2:
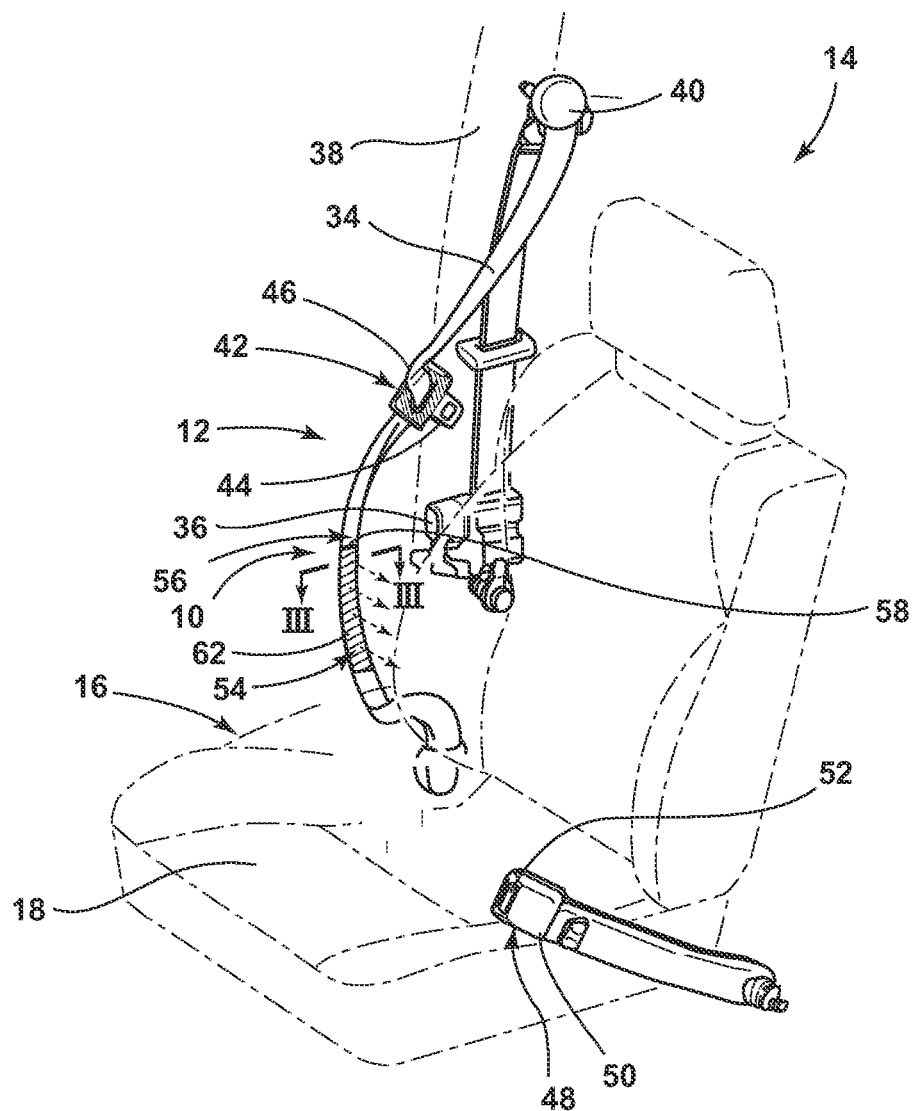
FIG. 2 is a perspective side view of a passenger seat disposed within a vehicle interior with a seatbelt assembly in an unlatched condition employing the lighting system according to one embodiment.

As shown in FIG. 2, the seatbelt assembly 12 includes a belt webbing 34 that is fixedly coupled to the seating assembly 16 or the vehicle 14 at one end and further coupled to a retractor 36 disposed within a B-pillar 38 of the vehicle 14 at the opposing end. The retractor 36 may also be located externally to the B-pillar 38 of the vehicle 14, and it is further contemplated that separate belt webbing 34 may be coupled to the vehicle seat 18 or the vehicle 14 using a second retractor 36 in a dual retractor system. The B-pillar 38 is generally disposed between a front passenger door and a rear passenger side door. As coupled to the retractor 36, the belt webbing 34 is retractable thereby allowing a vehicle occupant to move a seatbelt assembly 12 for latching the seatbelt assembly 12. It should be appreciated that any other seatbelt orientation may also be utilized for implementation of the lighting system 10 described herein.

The belt webbing 34 may have desired specifications assuring characteristics such as a specified tensile strength, elongation limits, and durability or the like. Further, the belt webbing 34 may be made of any material known in the art, including, but not limited to, multifilament or monofilament yarns made of polyester or polyamide yarns or fibers and may be woven into a belt by weaving the yarn in an intercrossed pattern.

In the embodiment shown in FIG. 2, the belt webbing 34 is coupled to a D-ring 40, or turning loop, which may be vertically adjustable along the B-pillar 38 for accommodating various vehicle occupants. The seatbelt assembly 12 further includes a tongue member 42, which is operably coupled to the belt webbing 34 and may be slidable along the belt webbing 34 for adjustable movement therealong. The tongue member 42 includes a buckle portion 44 and a mounting portion 46. The buckle portion 44 is configured to releasably couple to a seatbelt buckle 48 for restraining an occupant within the vehicle 14. The mounting portion 46 is coupled to and slidable along a portion of the belt webbing 34.

The seatbelt buckle 48 includes a housing 50 having an upper side that includes a latch mechanism 52 which is configured to releasably couple the seatbelt tongue buckle portion 44 to the seatbelt buckle 48. The buckle housing 50 may be comprised of a rigid polymeric material in assembly. For latching the seatbelt assembly 12, a user may grasp the seatbelt buckle 48, and pull the retractable belt webbing 34 outwardly a distance necessary to bring the seatbelt buckle 48 into contact with the tongue member 42. In this way, the seatbelt buckle 48 and the tongue member 42 are moveably associated with one another between a latched condition (position) and an unlatched condition (position).

A light source 54 may be disposed on and/or within the belt webbing 34. According to one embodiment, the light source 54 is oriented to emit light towards an occupant disposed on the seating assembly 16 employing the lighting system 10 described herein. According to one embodiment, the light source 54 includes a flexible circuit board (e.g., a copper flexible circuit) that is coupled to a lap portion 56 of the belt webbing 34 when the seatbelt assembly 12 is placed in the latched condition. In such an arrangement, the flexible circuit board may flex in conjunction with the lap portion 56 to allow the lighting system 10 to be contoured with the lap portion 56 of the belt webbing 34. According to one embodiment, the lap portion 56 may be defined as the portion of the belt webbing 34 disposed between the tongue member 42 and one end of the belt webbing 34 when the seatbelt assembly 12 is placed in the latched condition.

A photoluminescent structure 62 may be operatively coupled to, applied or otherwise arranged on and/or proximate the light source 54. One or more light sources 54 may be disposed within the lighting system 10 and configured to emit light towards a target location. More specifically, light emitted from the light source 54 towards the target location may be converted by the photoluminescent structure 62 and re-emitted as light having a different wavelength, typically in the visible spectrum. According to the illustrated embodiment, the target location is an area disposed proximately to the seat 18 of the seating assembly 16. Such a configuration may minimize distraction to a driver or other passengers within the vehicle 14 when the lighting system 10 is in the illuminated state. It is contemplated that the lighting system 10 may have a wide range of target locations such that the lighting system 10 may be used for a plurality of functions.

Exemplary functions include usage as a lamp for assisting an occupant in placing the seatbelt assembly 12 in the latched position, ambient lighting, and a warning light for notifying occupants of the vehicle that the seatbelt assembly 12 is not in the latched position, and/or a seat 18 lamp. It should also be appreciated that optics 116 (FIG. 3E) may be utilized to further minimize distraction to additional occupants of the vehicle 14.

The light source 54 may be over molded, or otherwise attached, to a portion of the belt webbing 34, such as a lap portion 56. According to the embodiment illustrated in FIG. 2, the belt webbing 34 and the light source 54 are placed in a mold simultaneously and an overmold material 66 is disposed over the combination of the belt webbing 34 and the light source 54. In embodiments where the overmold material 66 is cured under pressure, the overmold material 66 may be applied to the belt webbing 34 in a partly-cured condition. In one embodiment the over molding process includes applying the overmold material 66 onto at least a part of over the combination of the belt webbing 34 and light source 54 by spraying, brushing, dipping, printing, laminating or rolling, followed by curing the overmold material 66. Such a process results in the belt webbing 34 and light source 54 being coupled to one another. In some embodiments, the overmold material 66 may include a plastic, silicon, urethane material, or any other material that may be advantageous or structurally sound for placement within a zone that regularly comes in contact with occupants of the vehicle 14.

In some embodiments, a stop 58 may be integrally formed proximately to one end portion of the light source 54 by over molding additional material to the end portion of the light source 54 that may substantially limit sliding movement of the mounting portion 46 of the tongue member 42 along the belt webbing 34. The stop 58 may be formed from a second overmold material or may be formed from the same material used in the over molding process described above. The stop 58 may be made of any elastically and resiliently deformable material that returns to its original size and shape when the deforming force is removed.

Figure 3A:
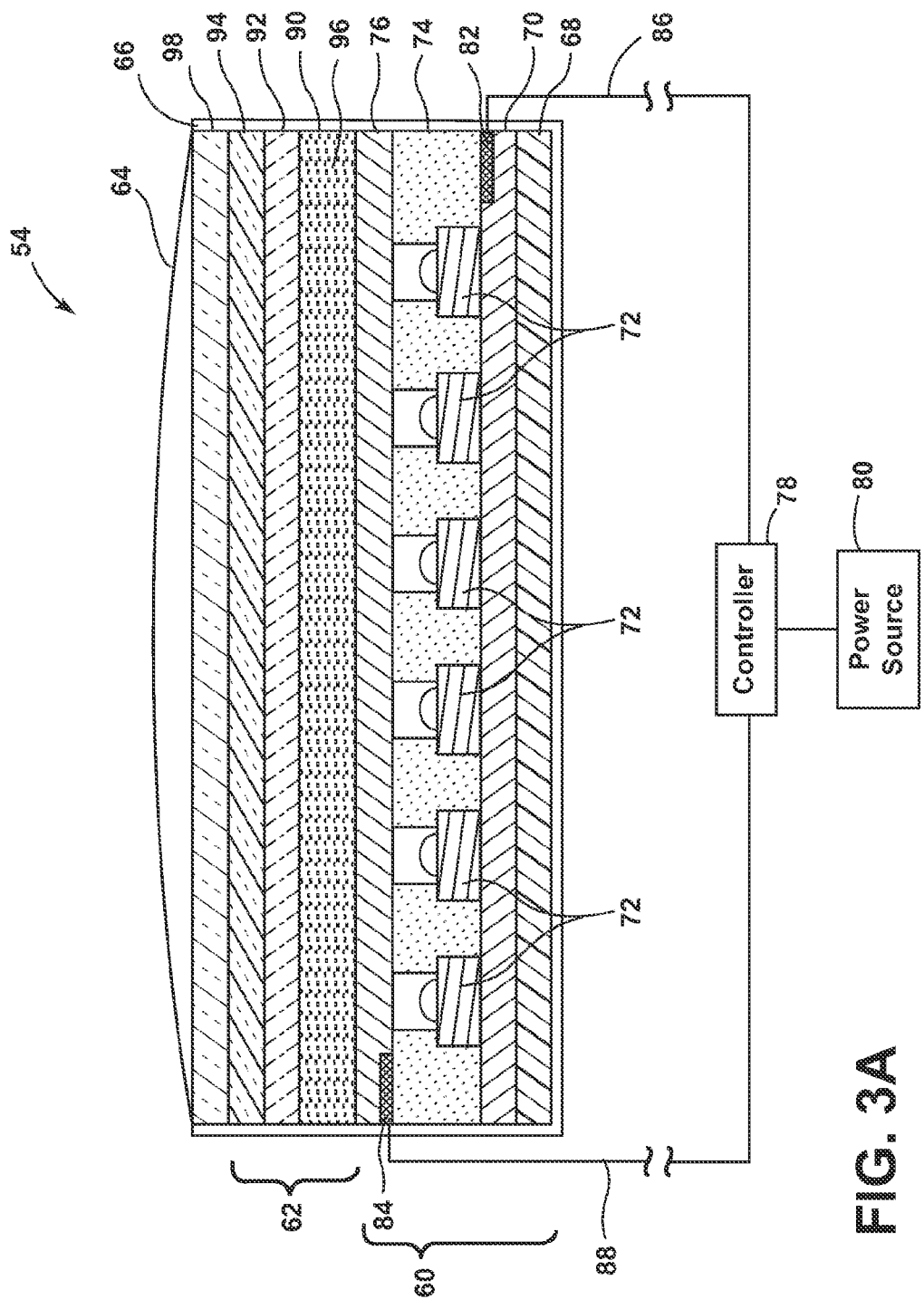
FIG. 3A is a cross-sectional view taken along line III-III of FIG. 2 illustrating a light source according to one embodiment.

Referring to FIGS. 3A-3E, a cross-sectional view of the light source 54 capable of use on a vehicle 14 with an external photoluminescent structure 62 is shown according to one embodiment. As illustrated in FIG. 3A, the light source 54 may have a stacked arrangement that includes a light-producing assembly 60, a photoluminescent structure 62, a viewable portion 64, and an overmold material 66. It should be appreciated that the viewable portion 64 and the overmold material 66 may be two separate components, or may be integrally formed as a single component.

The light-producing assembly 60 may correspond to a thin-film or printed light emitting diode (LED) assembly and includes a substrate 68 as its lowermost layer. The substrate 68 may include a polycarbonate, poly-methyl methacrylate (PMMA), or polyethylene terephthalate (PET) material on the order of 0.005 to 0.060 inches thick and is arranged over the intended vehicle 14 surface on which the light source 54 is to be received (e.g., belt webbing 34). Alternatively, as a cost saving measure, the substrate 68 may directly correspond to a preexisting vehicle structure (e.g., belt webbing 34, exterior panels, and/or interior panels).

The light-producing assembly 60 includes a positive electrode 70 arranged over the substrate 68. The positive electrode 70 includes a conductive epoxy such as, but not limited to, a silver-containing or copper-containing epoxy. The positive electrode 70 is electrically connected to at least a portion of a plurality of LED sources 72 arranged within a semiconductor ink 74 and applied over the positive electrode 70. Likewise, a negative electrode 76 is also electrically connected to at least a portion of the LED sources 72. The negative electrode 76 is arranged over the semiconductor ink 74 and includes a transparent or translucent conductive material such as, but not limited to, indium tin oxide. Additionally, each of the positive and negative electrodes 70, 76 are electrically connected to a controller 78 and a power source 80 via a corresponding bus bar 82, 84 and conductive leads 86, 88. The bus bars 82, 84 may be printed along opposite edges of the positive and negative electrodes 70, 76 and the points of connection between the bus bars 82, 84 and the conductive leads 86, 88 may be at opposite corners of each bus bar 82, 84 to promote uniform current distribution along the bus bars 82, 84. It should be appreciated that in alternate embodiments, the orientation of components within the light-producing assembly 60 may be altered without departing from the concepts of the present disclosure. For example, the negative electrode 76 may be disposed below the semiconductor ink 74 and the positive electrode 70 may be arranged over the aforementioned semiconductor ink 74. Likewise, additional components, such as the bus bars 82, 84 may also be placed in any orientation such that the light-producing assembly 60 may emit light 100 (FIG. 3B) towards a desired location.

The LED sources 72 may be dispersed in a random or controlled fashion within the semiconductor ink 74 and may be configured to emit focused or non-focused light toward the photoluminescent structure 62. The LED sources 72 may correspond to micro-LEDs of gallium nitride elements on the order of about 5 to about 400 microns in size and the semiconductor ink 74 may include various binders and dielectric material including, but not limited to, one or more of gallium, indium, silicon carbide, phosphorous, and/or translucent polymeric binders.

The semiconductor ink 74 can be applied through various printing processes, including ink jet and silk screen processes to selected portion(s) of the positive electrode 70. More specifically, it is envisioned that the LED sources 72 are dispersed within the semiconductor ink 74, and shaped and sized such that a substantial quantity of the LED sources 72 align with the positive and negative electrodes 70, 76 during deposition of the semiconductor ink 74. The portion of the LED sources 72 that ultimately are electrically connected to the positive and negative electrodes 70, 76 may be illuminated by a combination of the bus bars 82, 84, controller 78, power source 80, and conductive leads 86, 88. According to one embodiment, the power source 80 may correspond to a vehicular power source 80 operating at 12 to 16 VDC. Additional information regarding the construction of light-producing assemblies is disclosed in U.S. Patent Publication No. 2014/0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

Referring still to FIG. 3A, the photoluminescent structure 62 is arranged over the negative electrode 76 as a coating, layer, film or other suitable deposition. With respect to the presently illustrated embodiment, the photoluminescent structure 62 may be arranged as a multi-layered structure including an energy conversion layer 90, optional stability layer 92, and optional protection layer 94.

The energy conversion layer 90 includes at least one photoluminescent material 96 having energy converting elements with phosphorescent or fluorescent properties. For example, the photoluminescent material 96 may include organic or inorganic fluorescent dyes including rylenes, xanthenes, porphyrins, phthalocyanines. Additionally, or alternatively, the photoluminescent material 96 may include phosphors from the group of Ce-doped garnets such as YAG:Ce. The energy conversion layer 90 may be prepared by dispersing the photoluminescent material 96 in a polymer matrix to form a homogenous mixture using a variety of methods. Such methods may include preparing the energy conversion layer 90 from a formulation in a liquid carrier medium and coating the energy conversion layer 90 to the negative electrode 76 or other desired substrate 68. The energy conversion layer 90 may be applied to the negative electrode 76 by painting, screen printing, flexography, spraying, slot coating, dip coating, roller coating, bar coating, and/or any other methods known in the art. Alternatively, the energy conversion layer 90 may be prepared by methods that do not use a liquid carrier medium. For example, the energy conversion layer 90 may be rendered by dispersing the photoluminescent material 96 into a solid state solution (homogenous mixture in a dry state) that may be incorporated in a polymer matrix formed by extrusion, injection seal, compression seal, calendaring, thermoforming, etc.

To protect the photoluminescent material 96 contained within the energy conversion layer 90 from photolytic and thermal degradation, the photoluminescent structure 62 may include the stability layer 92. The stability layer 92 may be configured as a separate layer optically coupled and adhered to the energy conversion layer 90 or otherwise integrated therewith. The photoluminescent structure 62 may also include the protection layer 94 optically coupled and adhered to the stability layer 92 or other layer (e.g., the energy conversion layer 90 in the absence of the stability layer 92) to protect the photoluminescent structure 62 from physical and chemical damage arising from environmental exposure. The stability layer 92 and/or the protection layer 94 may be combined with the energy conversion layer 90 through sequential coating or printing of each layer, sequential lamination or embossing, or any other suitable means. Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

In operation, the photoluminescent material 96 is formulated to become excited upon receiving inputted light 100 (FIG. 3B) of a specific wavelength from at least a portion of the LED sources 72 of the light-producing assembly 60. As a result, the inputted light 100 undergoes an energy conversion process and is re-emitted at a different wavelength. According to one embodiment, the photoluminescent material 96 may be formulated to convert inputted light 100 into a longer wavelength light, otherwise known as down conversion. Alternatively, the photoluminescent material 96 may be formulated to convert inputted light 100 into a shorter wavelength light, otherwise known as up conversion. Under either approach, light converted by the photoluminescent material 96 may be immediately outputted 102 (FIG. 3B) from the photoluminescent structure 62 or otherwise used in an energy cascade, wherein the converted light 102 serves as inputted light 100 to excite another formulation of photoluminescent material 96 located within the energy conversion layer 90, whereby the subsequent converted light 102 may then be outputted from the photoluminescent structure 62 or used as inputted light 100, and so on. With respect to the energy conversion processes described herein, the difference in wavelength between the inputted light 100 and the converted light 102 is known as the Stokes shift and serves as the principle driving mechanism for an energy conversion process corresponding to a change in wavelength of light.

With continued reference to FIG. 3A, the viewable portion 64 is arranged over the photoluminescent structure 62. In some embodiments, the viewable portion 64 may include a plastic, silicon, or urethane material and is molded over the photoluminescent structure 62 and light-producing assembly 60. Preferably, the viewable portion 64 should be at least partially light transmissible. In this manner, the viewable portion 64 will be illuminated by the photoluminescent structure 62 whenever an energy conversion process is underway. Additionally, by over-sealing the viewable portion 64, it may also function to protect the photoluminescent structure 62 and the light-producing assembly 60. The viewable portion 64 may be arranged in a planar shape and/or an arcuate shape to enhance its viewing potential when in a luminescent state. Like the photoluminescent structure 62 and the light-producing assembly 60, the viewable portion 64 may also benefit from a thin design, thereby helping to fit the light source 54 into small package spaces of the vehicle 14.

In some embodiments, a decorative layer 98 may be disposed between the viewable portion 64 and the photoluminescent structure 62. The decorative layer 98 may include a polymeric material or other suitable material and is configured to control or modify an appearance of the viewable portion 64 of the light source 54. For example, the decorative layer 98 may be configured to confer a woven fabric appearance to the viewable portion 64 when the viewable portion 64 is in an unilluminated state. In other embodiments, the decorative layer 98 may be tinted any color to complement the vehicle structure on which the light source 54 is to be received. For example, the decorative layer 98 may be similar in color to that of the belt webbing 34 so that the lighting system 10 is substantially hidden when in the unilluminated state. Alternatively, the decorative layer 98 may provide indicia and/or an emblem such that the decorative layer 98 and indicia may be backlit and/or otherwise illuminated by the light-producing assembly 60. In any event, the decorative layer 98 should be at least partially light transmissible such that the photoluminescent structure 62 is not prevented from illuminating the viewable portion 64 whenever an energy conversion process is underway.

The overmold material 66 is disposed around the light-producing assembly 60 and photoluminescent structure 62. The overmold material 66 may protect the light-producing assembly 60 from a physical and chemical damage arising from environmental exposure. The overmold material 66 may have viscoelasticity (i.e., having both viscosity and elasticity), a low Young's modulus, and/or a high failure strain compared with other materials so that the overmold material 66 may protect the light-producing assembly 60 when contact is made thereto. For example, the overmold material 66 may protect the light-producing assembly 60 from the repetitive contact that may occur when the occupants utilize the seating assembly 16 employing the lighting system 10 described herein.

In some embodiments, the photoluminescent structure 62 may be employed separate and away from the light-producing assembly 60. For example, the photoluminescent structure 62 may be positioned on a vehicle component or surface proximate, but not in physical contact, with the light-producing assembly 60, as will be described in more detail below. It should be understood that in embodiments where the photoluminescent structure 62 is incorporated into distinct components separated from the light source 54, the light source 54 may still have the same or similar structure to the light source 54 described in reference to FIG. 3A.

Figure 3B:
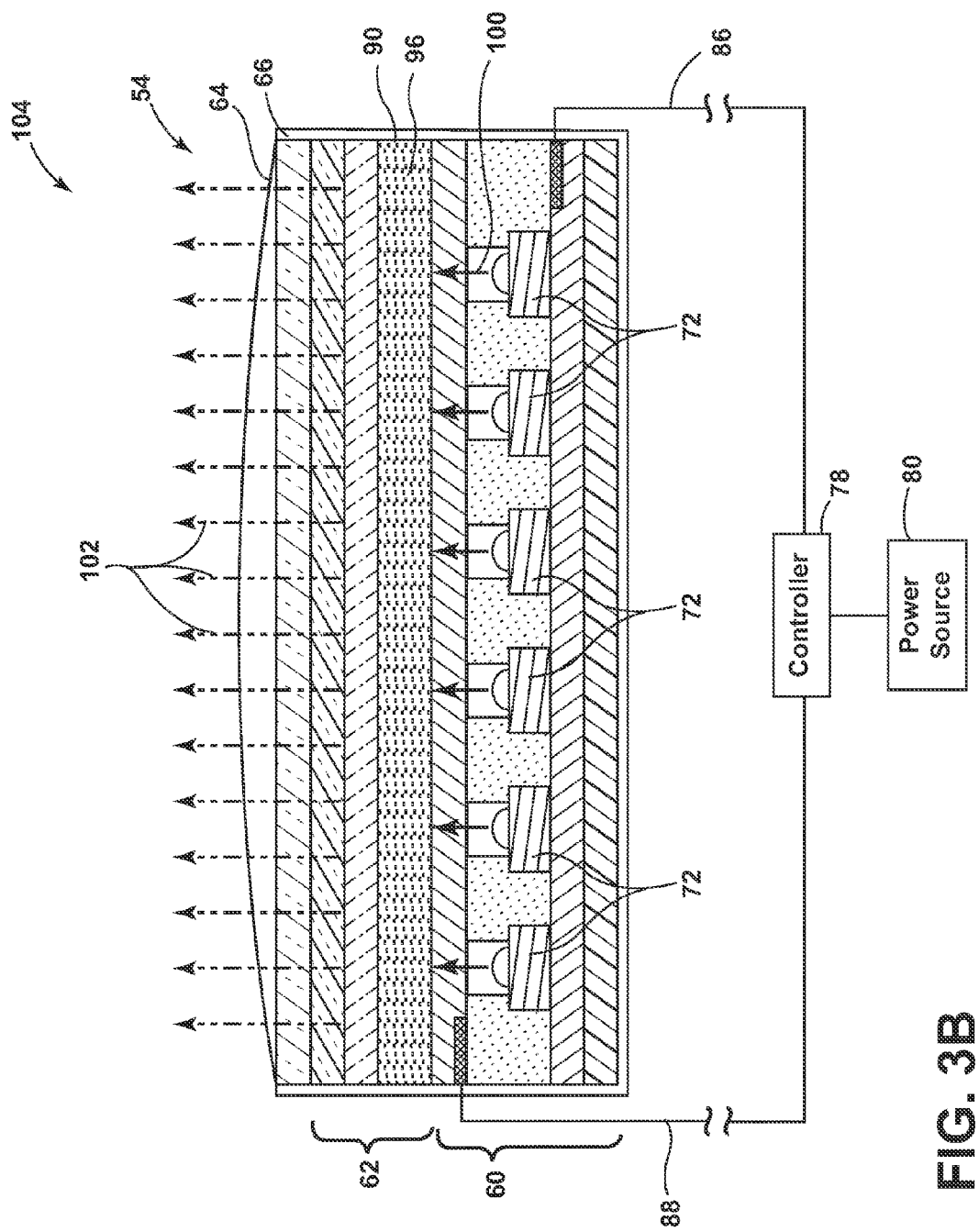
FIG. 3B is a cross-sectional view taken along line III-III of FIG. 2 further illustrating an the light source, according to one embodiment.

Referring to FIG. 3B, an energy conversion process 104 for producing single color luminescence is illustrated according to one embodiment. For purposes of illustration, the energy conversion process 104 is described below using the light source 54 depicted in FIG. 3A. In this embodiment, the energy conversion layer 90 of the photoluminescent structure 62 includes a single photoluminescent material 96, which is configured to convert inputted light 100 received from LED sources 72 into an outputted light 102 having a wavelength different than that associated with the inputted light 100. More specifically, the photoluminescent material 96 is formulated to have an absorption spectrum that includes the emission wavelength of the inputted light 100 supplied from the LED sources 72. The photoluminescent material 96 is also formulated to have a Stokes shift resulting in the converted visible light 102 having an emission spectrum expressed in a desired color, which may vary per lighting application. The converted visible light 102 is outputted from the light source 54 via the viewable portion 64, thereby causing the viewable portion 64 to illuminate in the desired color. In one embodiment, the energy conversion process is undertaken by way of down conversion, whereby the inputted light 100 includes light on the lower end of the visibility spectrum such as blue, violet, or ultraviolet (UV) light. Doing so enables blue, violet, or UV LEDs to be used as the LED sources 72, which may offer a relative cost advantage over simply using LEDs of the desired color and foregoing the energy conversion, process altogether. Furthermore, the illumination provided by the viewable portion 64 may offer a unique, substantially uniform, and/or attractive viewing experience that may be difficult to duplicate through non-photoluminescent means.

Figure 3C:
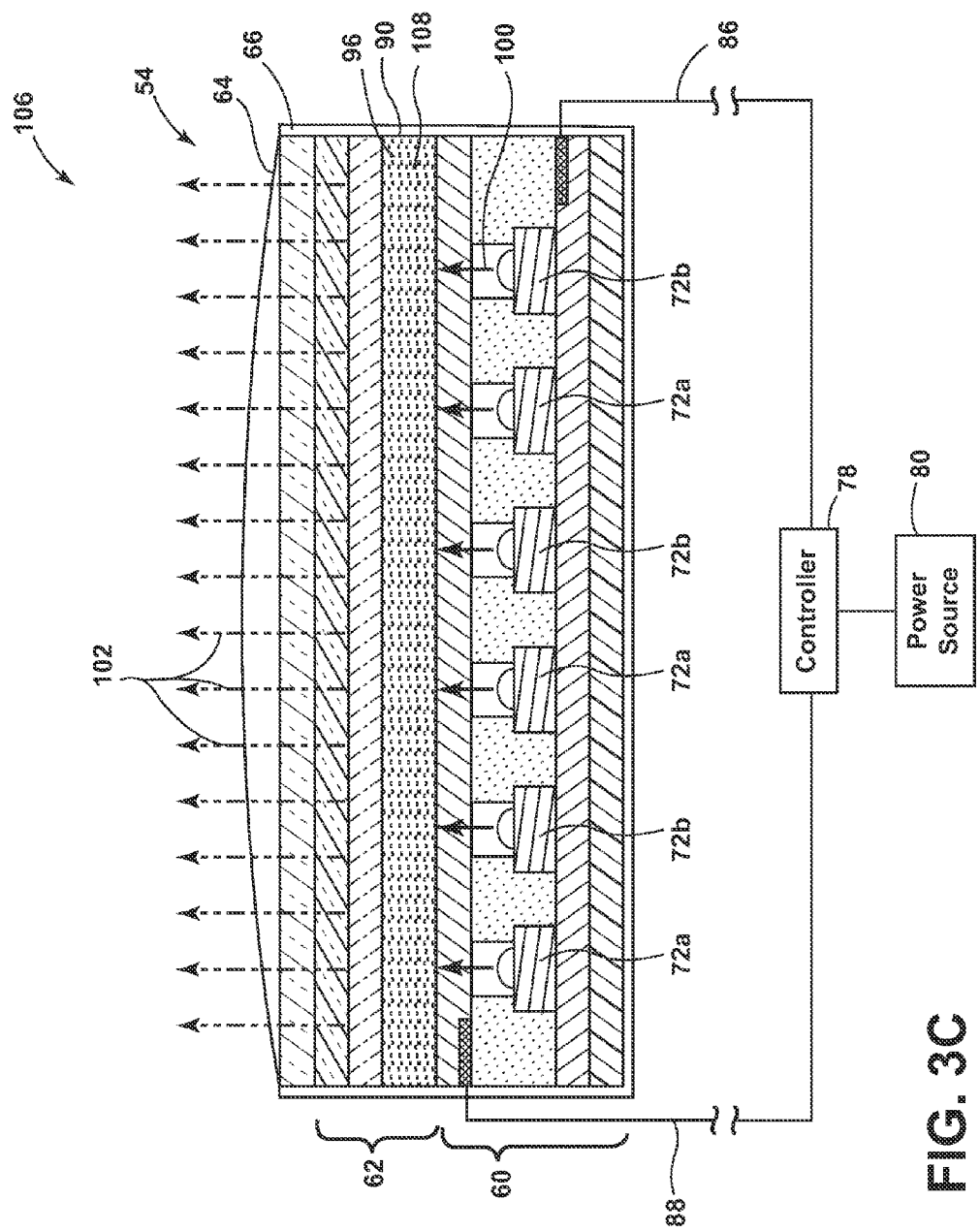
FIG. 3C is a cross-sectional view taken along line III-III of FIG. 2 illustrating an alternate light source, according to one embodiment.

Referring to FIG. 3C, a second energy conversion process 106 for generating multiple colors of light is illustrated according to one embodiment. For consistency, the second energy conversion process 106 is also described below using the light source 54 depicted in FIG. 3A. In this embodiment, the energy conversion layer 90 includes the first and second photoluminescent materials 96, 108 that are interspersed within the energy conversion layer 90. Alternatively, the photoluminescent materials 96, 108 may be isolated from each other if desired. Also, it should be appreciated that the energy conversion layer 90 may include more than two different photoluminescent materials 96, 108, in which case, the teachings provided below similarly apply. In one embodiment, the second energy conversion process 106 occurs by way of down conversion using blue, violet, and/or UV light as the source of excitation.

With respect to the presently illustrated embodiment, the excitation of photoluminescent materials 96, 108 is mutually exclusive. That is, photoluminescent materials 96, 108 are formulated to have non-overlapping absorption spectrums and Stoke shifts that yield different emission spectrums. Also, in formulating the photoluminescent materials 96, 108, care should be taken in choosing the associated Stoke shifts such that the converted light 102 emitted from one of the photoluminescent materials 96, 108, does not excite the other, unless so desired. According to one exemplary embodiment, a first portion of the LED sources 72, exemplarily shown as LED sources 72a, is configured to emit an inputted light 100 having an emission wavelength that only excites photoluminescent material 96 and results in the inputted light 100 being converted into a visible light 102 of a first color (e.g., white). Likewise, a second portion of the LED sources 72, exemplarily shown as LED sources 72b, is configured to emit an inputted light 100 having an emission wavelength that only excites second photoluminescent material 108 and results in the inputted light 100 being converted into a visible light 102 of a second color (e.g., red). Preferably, the first and second colors are visually distinguishable from one another. In this manner, LED sources 72a and 72b may be selectively activated using the controller 78 to cause the photoluminescent structure 62 to luminesce in a variety of colors. For example, the controller 78 may activate only LED sources 72a to exclusively excite photoluminescent material 96, resulting in the viewable portion 64 illuminating in the first color. Alternatively, the controller 78 may activate only LED sources 72b to exclusively excite the second photoluminescent material 108, resulting in the viewable portion 64 illuminating in the second color.

Alternatively still, the controller 78 may activate LED sources 72a and 72b in concert, which causes both of the photoluminescent materials 96, 108 to become excited, resulting in the viewable portion 64 illuminating in a third color, which is a color mixture of the first and second color (e.g., pinkish). The intensities of the inputted light 100 emitted from each light source 54 may also be proportionally varied to one another such that additional colors may be obtained. For energy conversion layers containing more than two distinct photoluminescent materials, a greater diversity of colors may be achieved. Contemplated colors include red, green, blue, and combinations thereof, including white, all of which may be achieved by selecting the appropriate photoluminescent materials and correctly manipulating their corresponding LED sources 72.

Figure 3D:
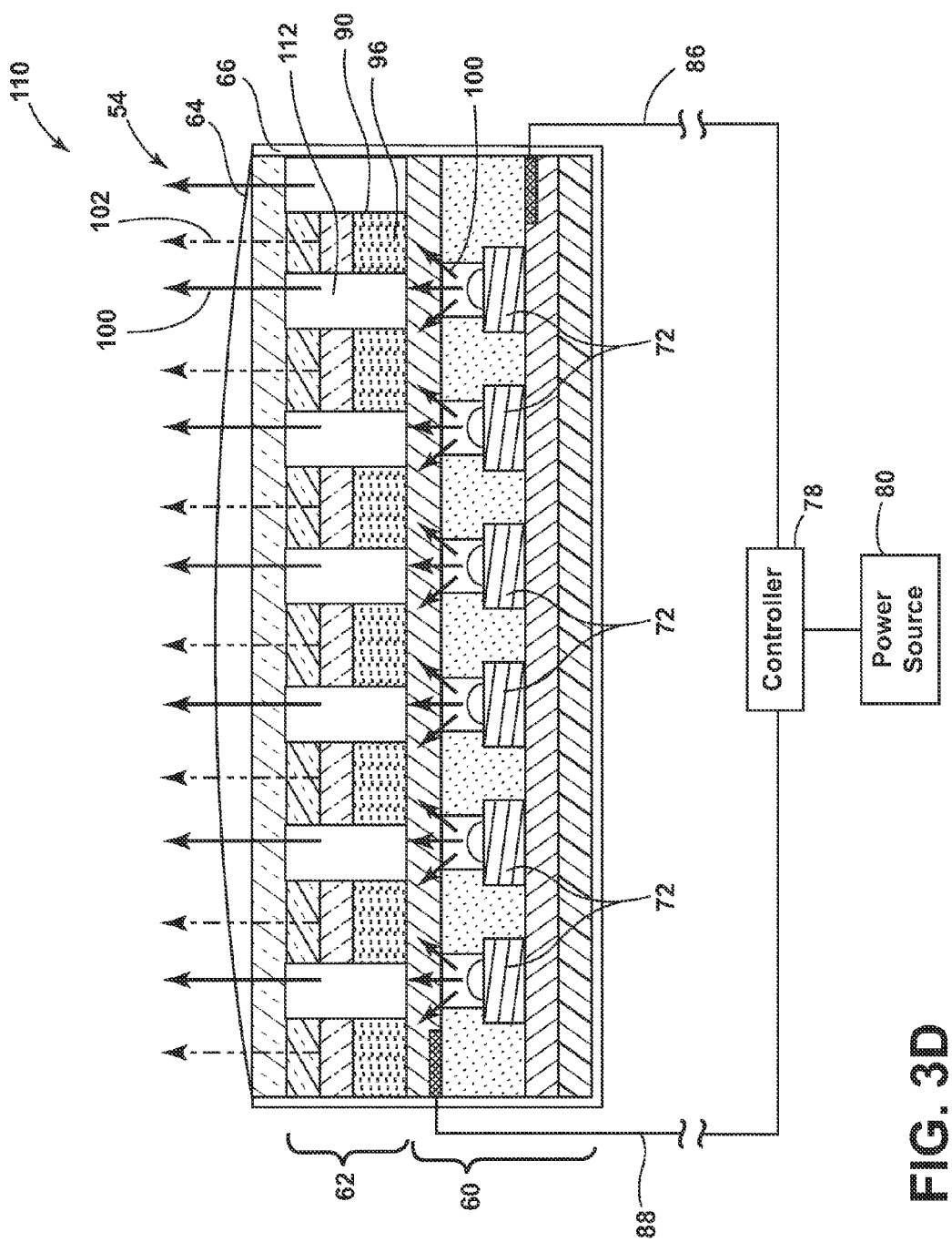
FIG. 3D is a cross-sectional view taken along line III-III of FIG. 2 illustrating a light source having a luminescent structure separated by light transmissive portions disposed on the light source, according to one embodiment.

Referring to FIG. 3D, a third energy conversion process 110 includes a light-producing assembly 60, such as the one described in reference to FIG. 3A, and a photoluminescent structure 62 disposed thereon is illustrated, according to an alternate embodiment. The photoluminescent structure 62 is configured to convert inputted light 100 received from LED sources 72 into a visible light 102 having a wavelength different than that associated with the inputted light 100. More specifically, the photoluminescent structure 62 is formulated to have an absorption spectrum that includes the emission wavelength of the inputted light 100 supplied from the LED sources 72. The photoluminescent material 96 is also formulated to have a Stokes shift resulting in the converted visible light 102 having an emission spectrum expressed in a desired color, which may vary per lighting application.

The photoluminescent structure 62 may be applied to only a portion of the light-producing assembly 60, for example, in a stripped manner. Between the photoluminescent structures 62 may be light transmissive portions 112 that allow inputted light 100 emitted from the LED sources 72 to pass therethrough at the first wavelength. The light transmissive portions 112 may be an open space, or may be a transparent or translucent material. The light 100 emitted through the light transmissive portions 112 may be directed from the light-producing assembly 60 towards a second photoluminescent structure 132 (FIG. 5) disposed proximate to the light-producing assembly 60. The second photoluminescent structure 132 may be configured to luminesce in response to the inputted light 100 that is directed through the light transmissive portions 112.

Figure 3E:
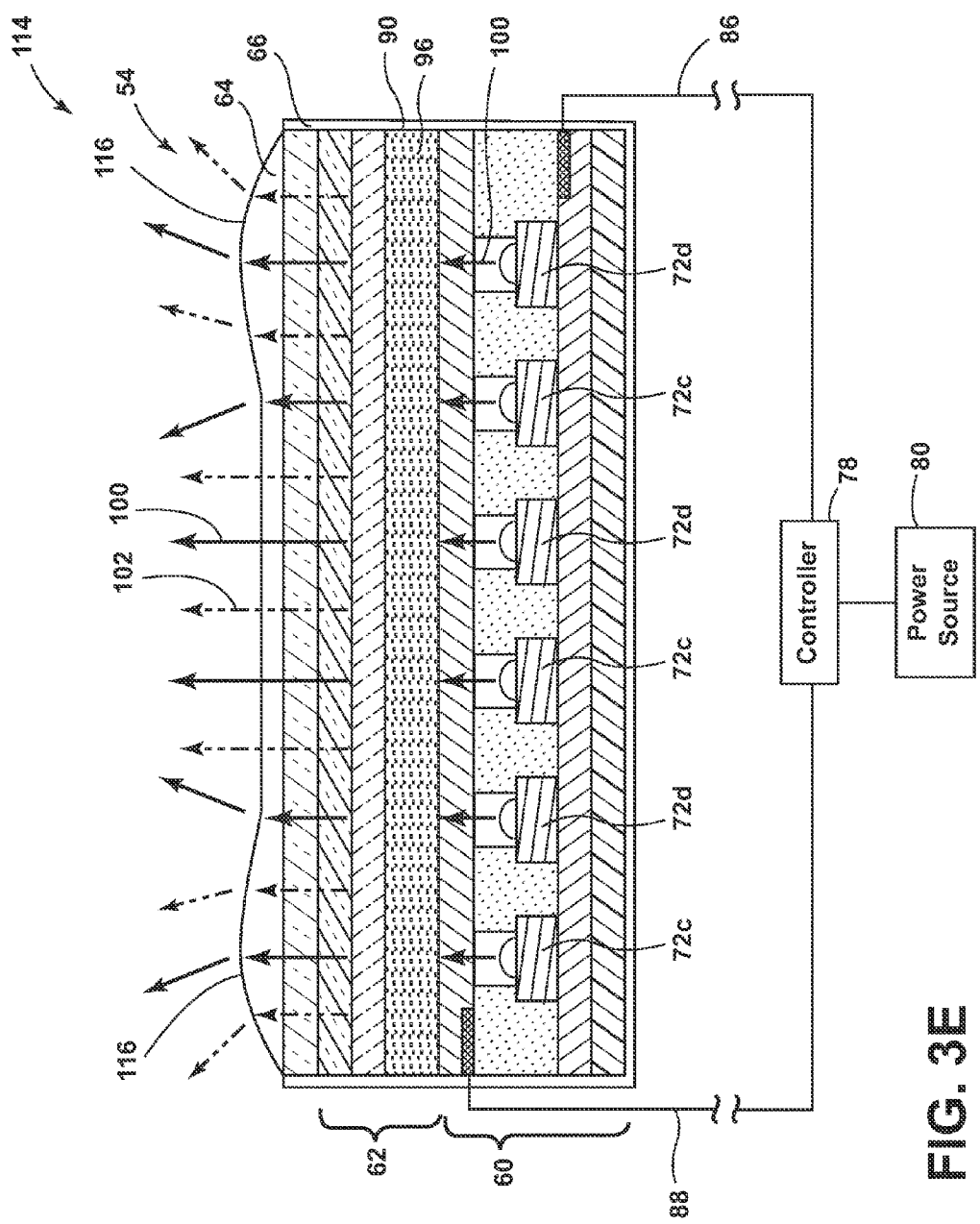
FIG. 3E is a cross-sectional view taken along line III-III of FIG. 2 illustrating an alternate light source having a luminescent structure disposed on the light source configured to convert a portion of light emitted from the light source from a first wavelength to a second wavelength, according to one embodiment.

Referring to FIG. 3E, a fourth energy conversion process 114 for generating multiple colors of light utilizing the light-producing assembly 60, such as the one described in reference to FIG. 3A, and a photoluminescent structure 62 disposed thereon is illustrated. In this embodiment, the photoluminescent structure 62 is disposed over a top portion of the light-producing assembly 60. The excitation of photoluminescent material 96 is formulated such that a portion of inputted light 100 emitted from the LED sources 72 passes through the photoluminescent structure 62 at the first wavelength (i.e., the inputted light 100 emitted from the light source 54 is not converted by the photoluminescent structure 62). The intensity of the emitted light 100 may be modified by pulse-width modulation or current control to vary the amount of inputted light 100 emitted from the LED sources 72 that passes through the photoluminescent structure 62 without converting to a second, outputted 102 wavelength. For example, if the light source 54 is configured to emit light 100 at a low level, substantially all of the light 100 may be converted to the second wavelength 102. In this configuration, a color of light 102 corresponding to the photoluminescent structure 62 may be emitted from the light-producing assembly 60. If the light source 54 is configured to emit inputted light 100 at a high level, only a portion of the first wavelength may be converted by the photoluminescent structure 62. In this configuration, a first portion of the emitted light 100 may be converted by the photoluminescent structure 62 and a second portion of the light 100 may be emitted from the light-producing assembly 60 at the first wavelength towards additional photoluminescent structures 132 disposed proximately to the light source 54. The additional photoluminescent structures 132 may luminesce in response to the light 100 emitted from the light source 54.

According to one exemplary embodiment, a first portion of the LED sources 72, exemplarily shown as LED sources 72a is configured to emit an inputted light 100 having a wavelength that excites the photoluminescent material 96 within the photoluminescent structure 62 and results in the inputted light 100 being converted into a visible light 102 of a first color (e.g., white). Likewise, a second portion of the LED sources 72, exemplarily shown as LED sources 72c, is configured to emit an inputted light 100 having a wavelength that passes through the photoluminescent structure 62 and excites additional photoluminescent structures 132 disposed proximately to the lighting system 10 thereby illuminating in a second color. The first and second colors may be visually distinguishable from one another. In this manner, LED sources 72a and 72c may be selectively activated using the controller 78 to cause the lighting system 10 to luminesce in a variety of colors.

The light-producing assembly 60 may also include optics 116 that are configured to direct light 100 emitted from the LED sources 72a, 72c and the light 102 emitted from the photoluminescent structure 62 towards pre-defined locations. For example, light 100 emitted from the LED sources 72a, 72c and the photoluminescent structure 62 may be directed and/or focused towards a desired feature 152 (FIG. 6) and/or location proximate to the light source 54.

Figure 4:
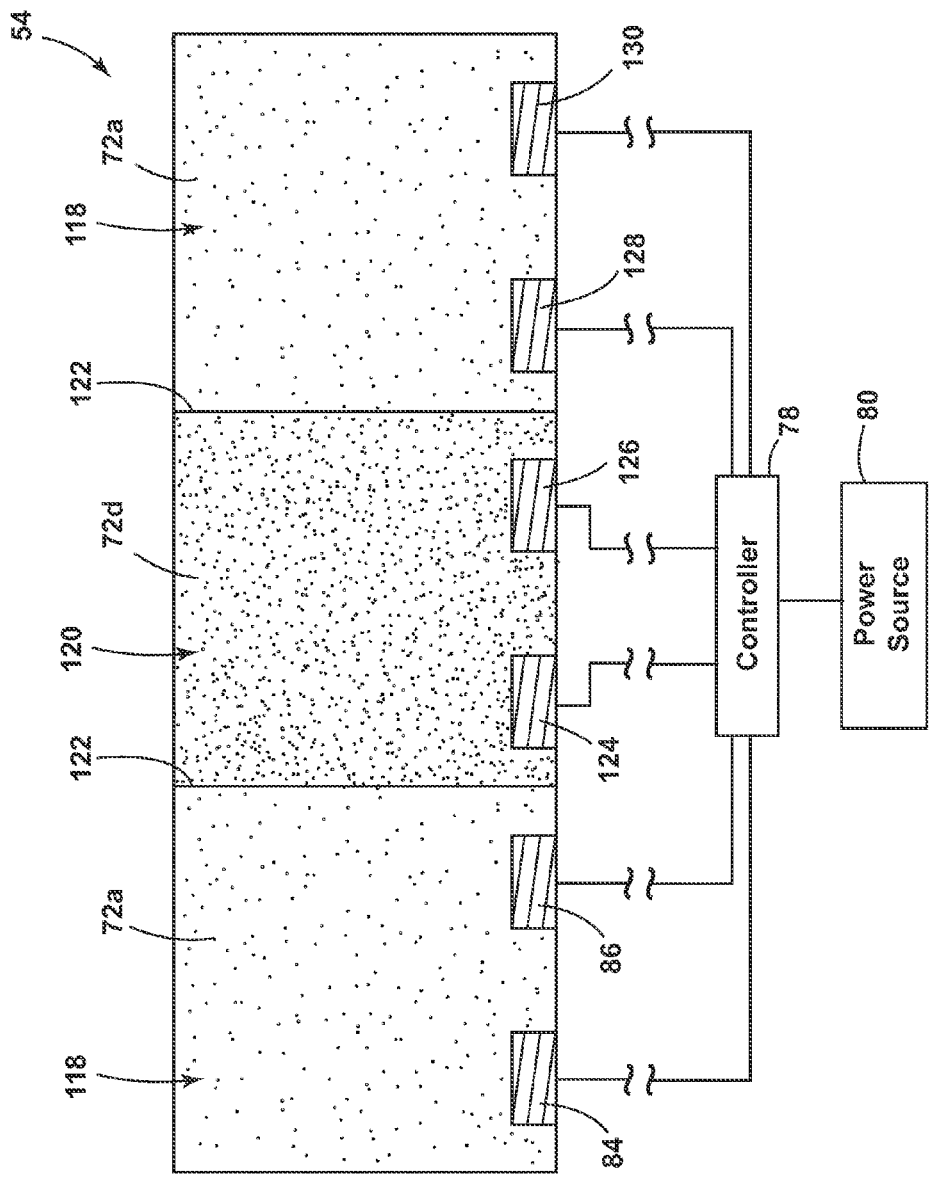
FIG. 4 illustrates a top view of a light-producing assembly, according to one embodiment, having varying types and concentrations of LED sources transversely along the light-producing assembly.

Referring to FIG. 4, a light-producing assembly 60, according to one embodiment, is illustrated from a top view having varying types and concentrations of LED sources 72a, 72d transversely along the light-producing assembly 60. As illustrated, a first portion 118 of the light-producing assembly 60 includes LED sources 72a that are configured to emit an inputted light 100 having an emission wavelength in a first color (e.g., white) spectrum. Likewise, a second portion 120 of the light-producing assembly 60 includes LED sources 72d that are configured to emit an inputted light 100 having an emission wavelength in a second color (e.g., red) spectrum. The first and second portions 118, 120 of the light-producing assembly 60 may be separated by insulative, or non-conductive, barriers 122 from proximately disposed portions through any means known in the art such that each portion 118, 120 may be illuminated independently of any other portion 118, 120. Further, each portion 118, 120 disposed within the light-producing assembly 60 may include a respective bus bar 82, 84, 124, 126, 128, 130 coupled to the controller 78 and configured to illuminate each respective portion 118, 120.

According to one embodiment, the first and second colors are visually distinguishable from one another. In this manner, LED sources 72a and 72d may be selectively activated using the controller 78 to cause the LED sources 72a, 72d to illuminate in a variety of colors. For example, the controller 78 may activate only LED sources 72a to exclusively illuminate a portion 118 of the light-producing assembly 60 in the first color. Alternatively, the controller 78 may activate only LED sources 72d to exclusively illuminate a portion 120 of the light-producing assembly 60 in the second color. It should be appreciated that the light-producing assembly 60 may include any number of portions 118, 120 having varying LED sources 72a, 72d that may illuminate in any desired color. Moreover, it should also be appreciated that the portions having varying LED sources 72a, 72d may be orientated in any practicable manner and need not be disposed adjacently.

The semiconductor ink 74 may also contain various concentrations of LED sources 72a, 72d such that the density of the LED sources 72a, 72d, or number of LED sources 72a, 72d per unit area, may be adjusted for various lighting applications. In some embodiments, the density of LED sources 72a, 72d may vary across the length of the light source 54. For example, a central portion 120 of the light-producing assembly 60 may have a greater density of LED sources 72 than peripheral portions 118, or vice versa. In such embodiments, the light source 54 may appear brighter or have a greater luminance in order to preferentially illuminate pre-defined locations. In other embodiments, the density of LED sources 72a, 72d may increase or decrease with increasing distance from a preselected point.

Figure 5:
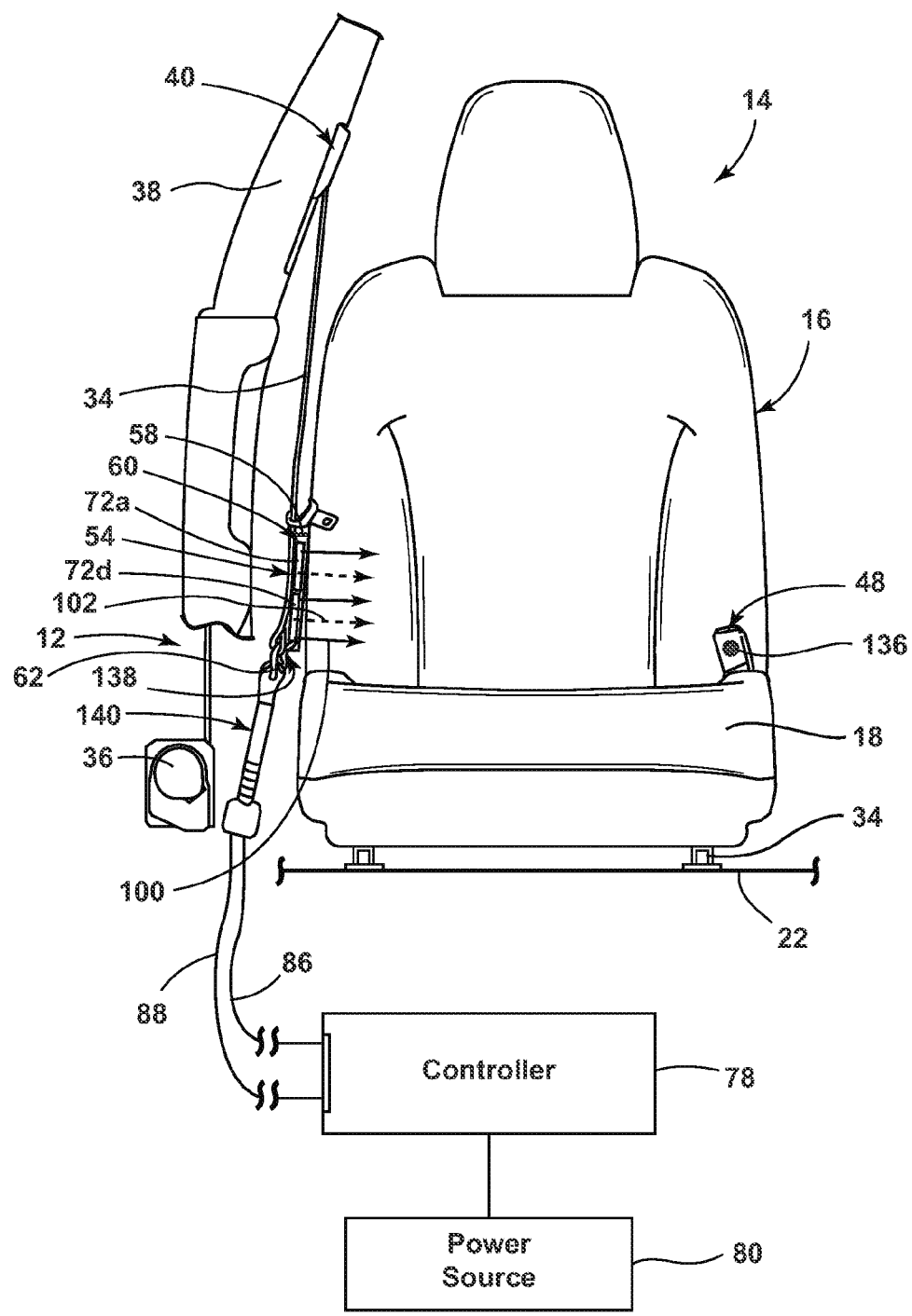
FIG. 5 is a front view of a vehicle seat employing the lighting system, according to one embodiment.

Referring to FIG. 5, the lighting system 10 disposed on the belt webbing 34 of a seatbelt assembly 12 is illustrated having a light-producing assembly 60 and an integrally formed stop 58, according to one embodiment. As illustrated, the light-producing assembly 60 emits a substantial portion of the inputted and outputted light 100, 102 in a vehicle 14 side to side orientation. However, it is contemplated that the emitted light 100 may be directed in any desired direction within the seatbelt assembly 12 depending on the structure and packaging of the seating assembly 16.

The lighting system 10 may further include a user interface 134 disposed proximately to the lighting system 10, or any other desired location within a vehicle 14. The user interface 134 may be configured such that a user may control the wavelength of light that is emitted by the LED sources 72a and/or the LED sources 72d that are illuminated. The user interface 134 may use any type of control known in the art for control the light source 54, such as, but not limited to, switches 136 (e.g., proximity sensors) and may be disposed in any practicable location. For example, the user interface 134 may be disposed on the buckle 48.

As illustrated in FIG. 5, LED sources 72a emit light 100 at a first wavelength such that the photoluminescent structure 62 disposed thereon emits a first color light (e.g., blue). Similarly, LED sources 72d emit light 100 at a second wavelength such that the photoluminescent structure 62 disposed thereon emits a second color light (e.g., red). According to one embodiment, the lighting system 10 may emit the first color light during a welcome and farewell sequence (i.e., when an occupant ingresses or egresses from the vehicle 14). The light source 54 may then turn off upon the seatbelt assembly 12 entering the latched condition. Alternatively, if the vehicle 14 senses an occupant on a seat 18 within the vehicle 14 through any known sensors incorporated into the vehicle and an unlatched condition for a pre-determined time (e.g., 30 seconds), the light source 54 may illuminate in the second color. Additionally, or alternatively, the light source 54 may illuminate in the second color when the vehicle 14 senses an occupant on a seat 18 within the vehicle 14 and an unlatched condition of the seatbelt assembly 12 while the vehicle is in motion. It should be appreciated that the light source 54 may illuminate at varying intensities based on the particular conditions of the lighting system 10 and/or the vehicle 14. Further, as the seat 18 position is placed in a more forwardly position, thereby hiding more of the belt webbing 34, the light source 54 may increase the intensity of light to ensure that the components of the seatbelt assembly 12 may be noticed by the occupant.

Still referring to FIG. 5, an end portion 138 of the belt webbing 34 may be attached through any means known in the art to an anchor member 140. The anchor member 140 may maintain the end portion 138 of the belt webbing 34 in a substantially fixed length from the attachment point to the lighting system 10. It should be appreciated that the anchor member 140 may be adjustable, however, through a plurality of positions in alternate embodiments. Anchor member 140 may be configured and/or include any components known in the art, such as an anchor bolt, rail, or other fasteners typically affixed to a seating assembly 16, floor 22, or other structural element of the associated vehicle 14. Conductive leads 86, 88 may be disposed in and/or through the anchor member 140 and thereby coupled to the controller 78 and the power source 80.

Figure 6:
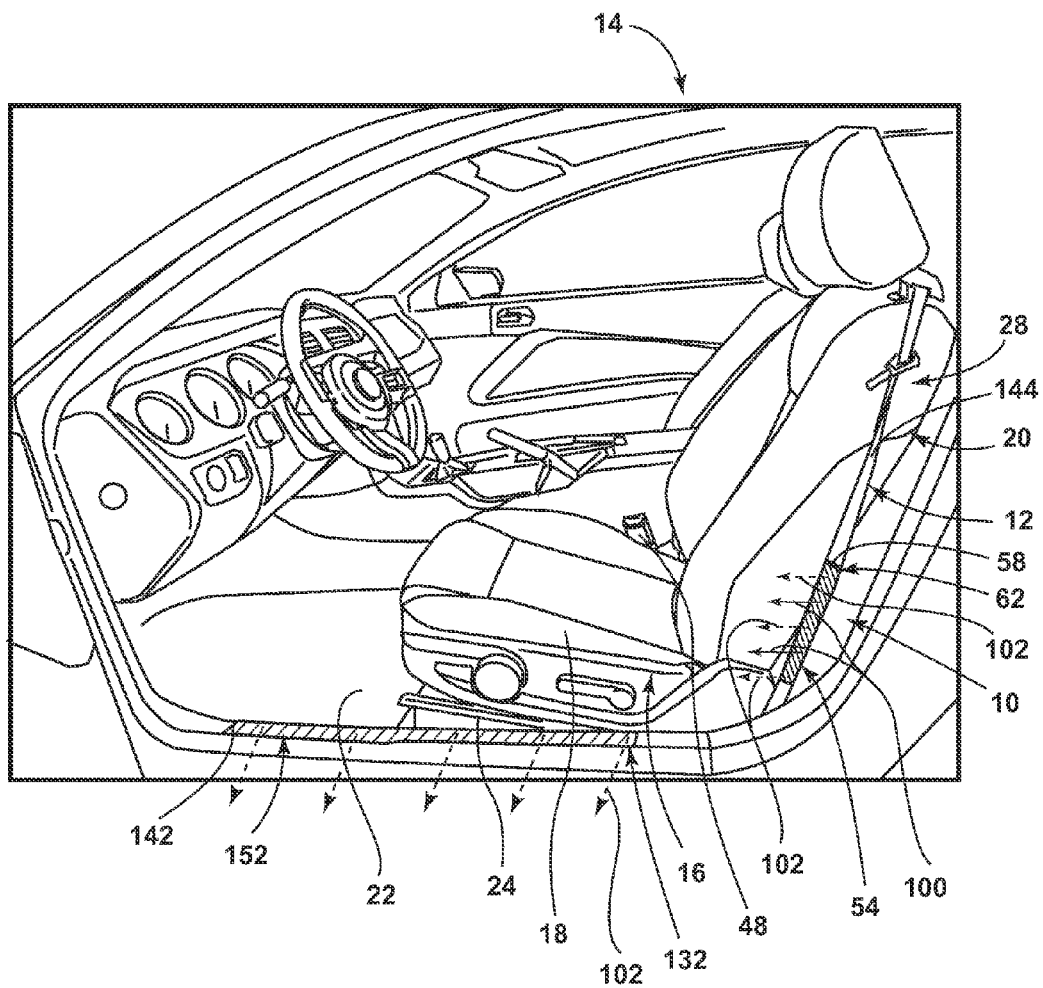
FIG. 6 illustrates a perspective view of a vehicle interior employing the lighting system and a second luminescent portion on a feature of the vehicle.

Referring to FIG. 6, a first photoluminescent structure 62 is disposed on the light-producing assembly 60 and a second photoluminescent structure 132 is disposed on another feature 152 of the vehicle 14, such as a vehicle door sill 142. As described above, the portion of the light-producing assembly 60 having the photoluminescent structure 62 thereon converts inputted light 100 to outputted light 102 of a different wavelength. A second portion of the light-producing assembly 60 emits inputted light 100 that is then converted by the second photoluminescent structure 132 on the door sill 142 to an outputted light 102 of a different wavelength. The outputted light 102 may be used as welcome/farewell sequence light, ambient light, and/or to illuminate any interior feature 152 of the vehicle 14 that may difficult to see in low light conditions. It is contemplated that the use of a second photoluminescent structure 132 proximate the lighting system 10 may be disposed at any desired location and is not limited to the door sill 142. For example, the second photoluminescent structure 132 may be disposed on the buckle 48 and configured to illuminate a portion thereof in low light conditions. Additionally, the second photoluminescent structure 132 may also provide safety benefits, such as notifying an incoming occupant of specific features within the vehicle 14.

As illustrated in FIG. 6, the light-producing assembly 60 may be attached, coupled, and/or over molded to a surface 144 of the belt webbing 34. Thus, the light-producing assembly 60 may be flushly mounted to the surface 144 of the belt webbing 34 thereby partially concealing from the view of occupants. According to one embodiment, the lighting system 10 and/or components thereof have a soft conformable encapsulation to both protect the lighting system 10 and to limit flexing of portions of the lighting system 10. Exemplary materials that may be utilized include, but are not limited to, polyvinyl chloride, vulcanized thermoplastic elastomer, and polyester elastomer. According to one embodiment, the lighting system 10 may have a hardness between 50 and 90 Shore A on the durometer scale.

Figure 7:
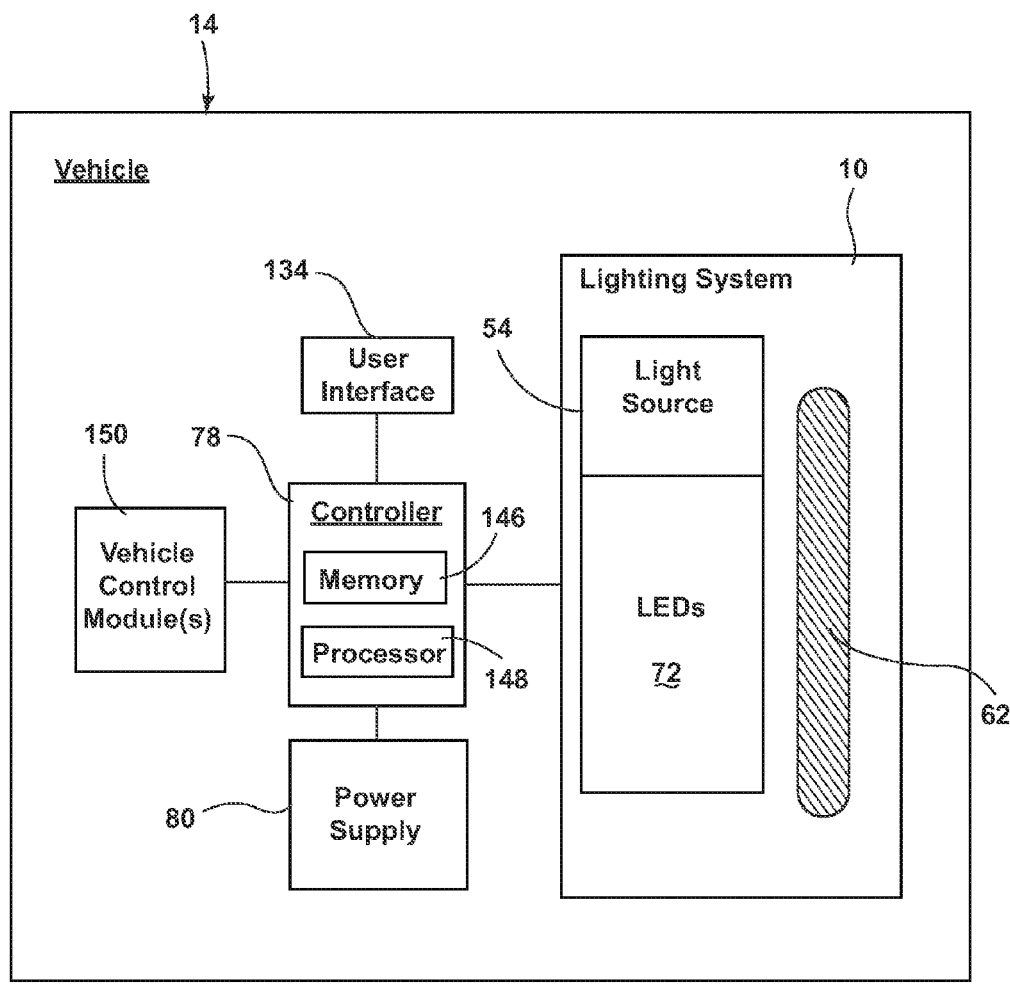
FIG. 7 is a block diagram of the vehicle and the illuminated lighting system.

Referring to FIG. 7, a block diagram of a vehicle 14 is generally shown in which the lighting system 10 is implemented. The lighting system 10 includes a controller 78 in communication with the light source 54. The controller 78 may include memory 146 having instructions contained therein that are executed by a processor 148 of the controller 78. The controller 78 may provide electrical power to the light source 54, or to a respective bus bar 82, 84, via a power source 80 located onboard the vehicle 14. In addition, the controller 78 may be configured to control the light emitted 100 from each light source 54 based on feedback received from one or more vehicle control modules 150 such as, but not limited to, a body control module, engine control module, steering control module, brake control module, the like, or a combination thereof. By controlling the light emitted 100 the light source 54, the lighting system 10 may illuminate in a variety of colors and/or patterns to provide an aesthetic appearance, or may provide vehicle information to an intended observer. For example, when the lighting system 10 is illuminated, the lighting system 10 may assist an occupant of the vehicle 14 in locating components of the seatbelt assembly 12, such as the tongue member 42 (FIG. 2) or buckle 48 (FIG. 2).

In operation, the photoluminescent structure 62 may exhibit periodic unicolor or multicolor illumination. For example, the controller 78 may prompt the light source 54 to periodically emit only the first wavelength of light 100 via the LED sources 72 to cause the photoluminescent structure 62 to periodically illuminate in the first color. Alternatively, the controller 78 may prompt the light source 54 to periodically emit only the second wavelength of light 100 via LED sources 72 to cause the photoluminescent portion to periodically illuminate in the second color. Alternatively, the controller 78 may prompt the light source 54 to simultaneously and periodically emit the first and second wavelengths of light 100 to cause the photoluminescent structure 62 to periodically illuminate in a third color defined by an additive light mixture of the first and second colors. Alternatively still, the controller 78 may prompt the light source 54 to alternate between periodically emitting the first and second wavelengths of light to cause the photoluminescent structure 62 to periodically illuminate by alternating between the first and second colors. The controller 78 may prompt the light source 54 to periodically emit the first and/or second wavelengths of light at a regular time interval and/or an irregular time interval.

In another embodiment, the lighting system 10 may include a user interface 134. The user interface 134 may be configured such that a user may control the wavelength of light 100 that is emitted by the LED sources 72 and/or the LED sources 72 that are illuminated. Such a configuration may allow a user to control which features are illuminated (e.g., task light, seat pocket light, etc.).

With respect to the above examples, the controller 78 may modify the intensity of the emitted first and second wavelengths of light by pulse-width modulation or current control. In some embodiments, the controller 78 may be configured to adjust a color of the emitted light by sending control signals to adjust an intensity or energy output level of the light source 54. For example, if the light source 54 is configured to output the first emission at a low level, substantially all of the first emission may be converted to the second emission. In this configuration, a color of light corresponding to the second emission may correspond to the color of the emitted light from the lighting system 10. If the light source 54 is configured to output the first emission at a high level, only a portion of the first emission may be converted to the second emission. In this configuration, a color of light corresponding to mixture of the first emission and the second emission may be output as the emitted light. In this way, each of the controllers 78 may control an output color of the emitted light.

Though a low level and a high level of intensity are discussed in reference to the first emission 100, it shall be understood that the intensity of the first emission 100 may be varied among a variety of intensity levels to adjust a hue of the color corresponding to the emitted light from the lighting system 10. As described herein, the color of the second emission 102 may be significantly dependent on the particular photoluminescent materials 96 utilized in the photoluminescent structure 62. Additionally, a conversion capacity of the photoluminescent structure 62 may be significantly dependent on a concentration of the photoluminescent material 96 utilized in the photoluminescent structure 62. By adjusting the range of intensities that may be output from the light source 54, the concentration, types, and proportions of the photoluminescent materials 96 in the photoluminescent structure 62 discussed herein may be operable to generate a range of color hues of the emitted light by blending the first emission with the second emission.

Accordingly, a lighting system utilizing a seatbelt assembly has been advantageously provided herein. The seatbelt assembly retains its structural and protective properties while providing luminescent light having both functional and decorative characteristics. In some embodiments, the light source may implement a thin design, thereby helping to fit the light source into small package spaces of the vehicle where traditional light sources may not be practicable.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A seatbelt assembly, comprising:
   a webbing having opposing ends each fixed to a vehicle structure;
   a tongue member slidable along the seatbelt webbing;
   a light source disposed on the seatbelt webbing, wherein a portion of the light source prevents the tongue member from movement beyond the light source; and
   a first photoluminescent structure operatively coupled to the light source and configured to luminesce in response to excitation by the light source.

2. The seatbelt assembly of claim 1, wherein the light source comprises a plurality of printed LEDs.

3. The seatbelt assembly of claim 2, wherein the first photoluminescent structure comprises at least one photoluminescent material configured to down convert an inputted light received from at least a portion of the light source into a visible light that is outputted to a viewable portion.

4. The seatbelt assembly of claim 3, wherein the inputted light comprises one of blue light, violet light, and UV light.

5. The seatbelt assembly of claim 1, further comprising:
   a second photoluminescent structure separated from the seatbelt webbing.

6. The seatbelt assembly of claim 1, further comprising a controller for controlling an activation state of the light source in response to at least one vehicle-related condition.

7. The seatbelt assembly of claim 1, wherein the light source flashes when a vehicle senses an occupant on a seat and an unlatched condition.

8. A lighting system for a vehicle seatbelt, comprising:
a seatbelt webbing having a tongue member slidable therealong, the tongue member releasably coupled to a buckle disposed on an opposing side of a seat;
a light source disposed on the seatbelt webbing;
an overmold material configured to maintain the tongue member above the light source; and
a first luminescent structure configured to luminesce in response to excitation by at least a portion of the light source.

9. The lighting system for a vehicle seatbelt of claim 8, wherein the light source comprises a printed LED.

10. The lighting system for a vehicle seatbelt of claim 8, wherein the light source is disposed on a lap portion of the webbing when a seatbelt assembly is placed in a latched condition.

11. The lighting system for a vehicle seatbelt of claim 9, wherein the luminescent structure comprises at least one luminescent material configured to down convert an inputted light received from at least a portion of the printed LED into a visible light that is outputted to a viewable portion.

12. The lighting system for a vehicle seatbelt of claim 8, further comprising:
a second luminescent structure separated from the seatbelt webbing.

13. The lighting system for a vehicle seatbelt of claim 12, wherein the first luminescent structure illuminates in a first color and a second luminescent structure illuminates in a second color.

14. A lighting system for a vehicle seating assembly, comprising:
a webbing having opposing ends each fixed to a vehicle structure;
a light source disposed on the webbing; and
a first photoluminescent structure disposed on a first vehicle component and a second photoluminescent structure disposed on a second vehicle component, wherein the first and second photoluminescent structures are operatively coupled to the light source and configured to luminesce in response to excitation by light output from at least a portion of the light source.

15. The lighting system for a vehicle seating assembly of claim 14, wherein the light source comprises a plurality of printed LEDs.

16. The lighting system for a vehicle seating assembly of claim 15, wherein the first and second photoluminescent structures each comprises at least one photoluminescent material configured to convert an inputted light received from at least a portion of the light sources into a visible light.

17. The lighting system for a vehicle seating assembly of claim 16, wherein the inputted light comprises one of blue light, violet light, and UV light.

18. The lighting system for a vehicle seating assembly of claim 14, wherein the first photoluminescent structure illuminates in a first color and the second photoluminescent structure illuminates in a second color.

19. The lighting system for a vehicle seating assembly of claim 18, further comprising:
a sensor configured to determine the presence of an occupant on a vehicle seat wherein the light source is actuated based on the sensed presence of an occupant.

20. The lighting system for a vehicle seating assembly of claim 19, wherein the light source illuminates in the second color when the vehicle senses an occupant on the seat and an unlatched condition.

* * * * *